(12) United States Patent
Sakamaki

(10) Patent No.: US 7,036,393 B2
(45) Date of Patent: May 2, 2006

(54) GEAR MADE OF RESIN, IMAGE-FORMING DEVICE, AND ROTATION-TRANSMITTING MEANS MADE OF RESIN

(75) Inventor: Kazuyuki Sakamaki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/870,279

(22) Filed: May 30, 2001

(65) Prior Publication Data

US 2002/0017153 A1 Feb. 14, 2002

(30) Foreign Application Priority Data

May 30, 2000 (JP) .............................. 2000-160669

(51) Int. Cl.
*F16H 55/14* (2006.01)

(52) U.S. Cl. .................. 74/443; 74/DIG. 10
(58) Field of Classification Search .............. 74/421 R, 74/443, DIG. 10
See application file for complete search history.

(56) References Cited

U.S. PATENT DOCUMENTS 3,361,004 A * 1/1968 Williams et al. .............. 74/434
6,070,484 A * 6/2000 Sakamaki ..................... 74/434
6,076,419 A * 6/2000 Mlejnek et al. ............ 74/421 R
6,181,899 B1 * 1/2001 Fukuchi ....................... 399/117

FOREIGN PATENT DOCUMENTS

JP 10-278124 * 10/1998

* cited by examiner

Primary Examiner—David Fenstermacher
(74) Attorney, Agent, or Firm—Koda & Androlia

(57) ABSTRACT

A gear 1 made of a resin includes webs 5 (5a and 5b) formed so that the rigidity of the web is increased by a first circumferential rib 8, a second circumferential rib 10, first diametrical ribs 11 and second diametrical ribs 12, and the circumferential sectional shape of the outermost web 5c is a corrugated shape, whereby the rigidity of the outermost web 5c is increased. As a result, it is possible to increase the rigidity of the outermost web 5c without increasing of the thickness of the outermost web 5c; to form a toothed portion 6 with a high accuracy; to reduce the deformation (for example, the amount of displacement of the toothed portion 6 and a shaft-supporting portion 4 in a rotating direction) due to an external force; and to enhance the rotation-transmitting accuracy. In this gear 1, a vibration and a noise due to the vibration can be reduced by increasing the rigidity of the web.

8 Claims, 9 Drawing Sheets

GEAR MADE OF RESIN, IMAGE-FORMING DEVICE, AND ROTATION-TRANSMITTING MEANS MADE OF RESIN

BACKGROUND OF THE INVENTION

1. Field of the Invention

The present invention relates to a gear made of a resin widely used in a power-transmitting mechanism such as a duplicator, a printer, a facsimile, an automobile part and the like, and an image-forming device such as a duplicator, a printer, a facsimile and the like, which is designed to drive a photoconductor through such gear made of the resin.

2. Description of the Related Art

A gear made of a resin is conventionally used in a power-transmitting mechanism such as a duplicator, an automobile part and the like for the purpose of reducing the cost and the weight of the part and reducing an operational sound. Such a gear made of a resin is formed into a predetermined shape by an injection molding, and the shape is contrived to provide a tooth-profile accuracy and a strength suited for the purpose of use.

(First Prior Art)

A gear 50 made of a resin shown in FIGS. 9 and 10 is formed into such a shape that an annular toothed portion 52 having teeth formed thereon and a boss (shaft-supporting portion) 54 fitted over a shaft 53 are connected to each other by a thin plate-shaped web 55. The web 55 connected to the toothed portion 52 is thinner and hence, the amount of radially inward contractive deformation of a connection between the web 55 and the toothed portion 52 after the injection molding and a portion in the vicinity of the connection is smaller, whereby a tooth profile can be formed with a higher accuracy. When the thickness of the web 55 connected to the toothed portion 52 is larger, the volume of the web 55 is larger, and the amount of radially inward contractive deformation of the web 55 after the injection molding is larger. For this reason, the connection between the web 55 and the toothed portion and the portion in the vicinity of the connection are deformed in such a manner that they are pulled in a direction of contraction of the web 55 and hence, the amount of toothed portion 52 deformed is larger, resulting in an increased reduction in accuracy of formation of the teeth 51.

On the other hand, when the gear 50 made of the resin as shown in FIGS. 9 and 10 transmits a power in a state in which it has received a radial load WR as shown in FIG. 11, the gear 55 is deformed elliptically in an increased amount, as shown by a dotted line in FIG. 11, resulting in a decreased accuracy of transmission of the rotation, because the web 55 receiving the radial load WR has a smaller thickness and a lower strength. When the gear 50 having a sectional shape as shown in FIG. 10 is a helical gear, a thrust load WS is applied to the toothed portion 52 and the web 55 and hence, the web 52 is deformed in a flexed manner in an increased amount in a direction of application of the thrust load WS, as shown by a dotted line in FIG. 12, resulting in a reduction accuracy of transmission of the rotation, because the thickness of the web 55 is smaller.

(Second Prior Art)

Therefore, to eliminate such a disadvantage, a gear 57 made of a resin has been considered which includes radial ribs 56 formed on a side of a web 55 to connect a boss 54 and a toothed portion to each other, so that the rigidity of the web 55 is increased, and the accuracy of transmission of the rotation is enhanced. In the gear 57 in which the boss 54 and the toothed portion 52 are connected directly to each other by the radial ribs 56, however, the following new disadvantage is brought about: A connection between the radial ribs 56 and the toothed portion 52 and a portion in the vicinity of the connection are contractively deformed radially inwards in an increased amount (shown by a dotted line in each of FIGS. 13 and 14), thereby generating a phenomenon of the falling of the teeth 51 as shown in FIG. 16, resulting in a reduced accuracy of a tooth profile.

(Third Prior Art)

A gear 60 made of a resin as shown in FIGS. 17 to 18 has been developed by the present applicant, wherein such disadvantages associated with the prior arts can be overcome. In the gear 60 made of the resin shown in FIGS. 17 to 18, a first circumferential rib 61 is formed concentrically with a boss 54 on a side of a web 55, and a second circumferential rib 62 is formed concentrically with a toothed portion 52 on a side of the web 55 between the first circumferential rib 61 and the toothed portion 52. Further, the boss 54 and the first circumferential rib 61, as well as the first circumferential rib 61 and the second circumferential rib 62 are connected to each other by diametrical ribs 63 and 64, respectively, so that the rigidity of the web 55 is increased without connection of the diametrical ribs 64 to the toothed portion 52. Therefore, such gear 60 made of the resin has a high tooth profile accuracy and a high rotation-transmitting accuracy and hence, is widely utilized in precision machines (see Japanese Patent Application Laid-open No. 10-278124)

In recent years, however, in an image-forming device such as a color printer, a color duplicator and the like, a small error of the rotation-transmitting accuracy of the gear 60 made of the resin appears as a color shift. Therefore, to prevent the color shift to enable a further clear printing, it is necessary to further increase the rotation-transmitting accuracy (dynamic accuracy) of the gear 60 made of the resin.

The recent image-forming device such as a color printer, a color duplicator and the like is disposed and used beside a desk in many cases and for this reason, it is required that the image-forming device is designed so that a vibration during operation and a noise due to the vibration can be reduced to maintain a quiet environment in a working place.

SUMMARY OF THE INVENTION

Accordingly, it is an object of the present invention to provide a gear made of a resin and an image-forming device using such gear, wherein the above-described problems can be solved.

To achieve the above object, according to a first aspect and feature of the present invention, there is provided a gear made of a resin, comprising a substantially annular toothed portion formed at a radially outer location, a shaft-supporting portion formed at a radially inner location around a rotational center of the toothed portion, a web connecting the shaft-supporting portion and the toothed portion to each other, wherein the web has a circumferential rib formed thereon concentrically with the toothed portion, and the circumferential sectional shape of the web between the circumferential rib and the toothed portion is a substantially corrugated shape.

With such configuration, the web is reinforced by the circumferential rib, and the circumferential sectional shape of the web between the circumferential rib and the toothed portion is the substantially corrugated-shape, whereby an increase in rigidity of the web is provided. Thus, according to the present invention, even if the thickness of the web is not increased, the rigidity of the web can be increased. Therefore, the tooth profile accuracy cannot be detracted in order to increase the rigidity of the web. Namely, according to the present invention, it is possible to enhance the rotation-transmitting accuracy (dynamic accuracy), while maintaining the shape accuracy (static accuracy) of the toothed portion. Moreover, according to the present invention, it is possible to reduce the torsional vibration due to a rotation-transmitting force and the flexural vibration due to a thrust force (which is a force in a direction of a rotational axis and in a direction perpendicular to the rotating direction) and to reduce the noise due to such vibrations by increasing the rigidity of the web.

According to a second aspect and feature of the present invention, there is provided an image-forming device comprising a gear made of a resin according to the first feature, and a drive means for driving a photoconductor through the gear made of the resin.

In the image-forming device having such arrangement, the rotation of the drive means is transmitted to the photoconductor through the gear made of the resin according to the first feature, thereby driving the photoconductor in rotation smoothly and with a high accuracy. Therefore, the formation of an image is achieved quietly and with a high accuracy without bringing about a disadvantage such as a color shift and the like.

According to a third aspect and feature of the present invention, there is provided a rotation-transmitting means made of a resin, comprising a substantially annular toothed portion formed at a radially outer location, a shaft-supporting portion formed at a radially inner location around a rotational center of the toothed portion, a web connecting the shaft-supporting portion and the toothed portion to each other, wherein the web has a circumferential rib formed thereon concentrically with the toothed portion, and the circumferential sectional shape of the web between the circumferential rib and the toothed portion is a substantially corrugated shape. Here, the rotation-transmitting means made of the resin includes, in addition to a gear made of a resin, a pulley made of a resin and having teeth meshed with a timing belt.

In the rotation-transmitting means having such configuration, the web is reinforced by the circumferential rib, and the circumferential sectional shape of the web between the circumferential rib and the toothed portion is the substantially corrugated shape, whereby an increase in rigidity of the web is provided. Thus, according to the present invention, even if the thickness of the web is not increased, the rigidity of the web can be increased. Therefore, the tooth profile accuracy cannot be detracted in order to increase the rigidity of the web. Namely, according to the present invention, it is possible to enhance the rotation-transmitting accuracy (dynamic accuracy), while maintaining the shape accuracy (static accuracy) of the toothed portion. Moreover, according to the present invention, it is possible to reduce the vibration and to reduce the noise due to the vibration by increasing the rigidity of the web. In other words, the rotation-transmitting means according to the present invention is capable of transmitting a power quietly and with a high accuracy.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of embodiments with reference to the accompanying drawings.

I. Gear Made of Resin

Figure 1:
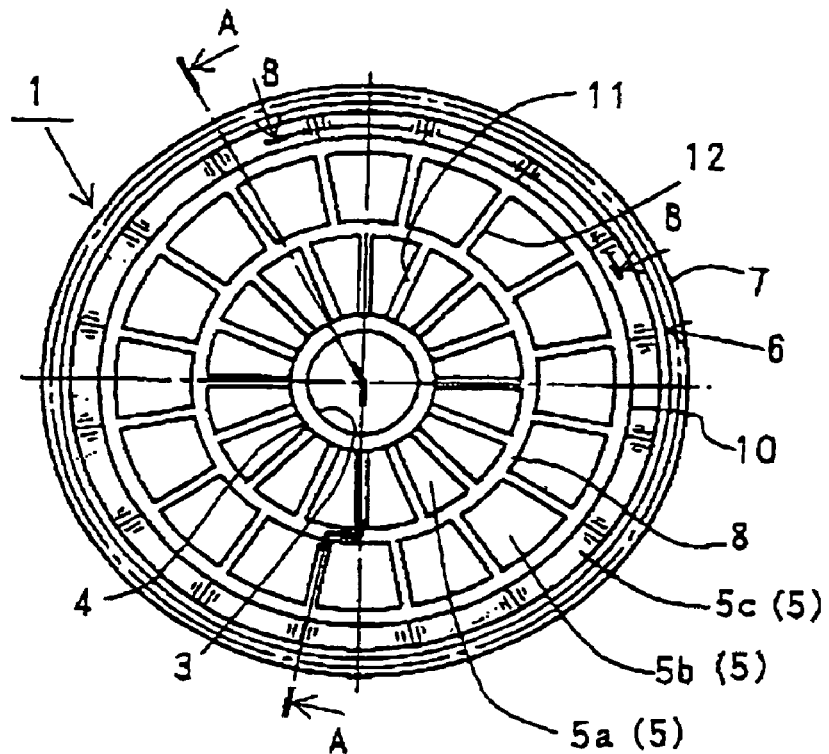
FIG. 1 is a front view of a gear made of a resin according to an embodiment of the present invention.
Figure 2:
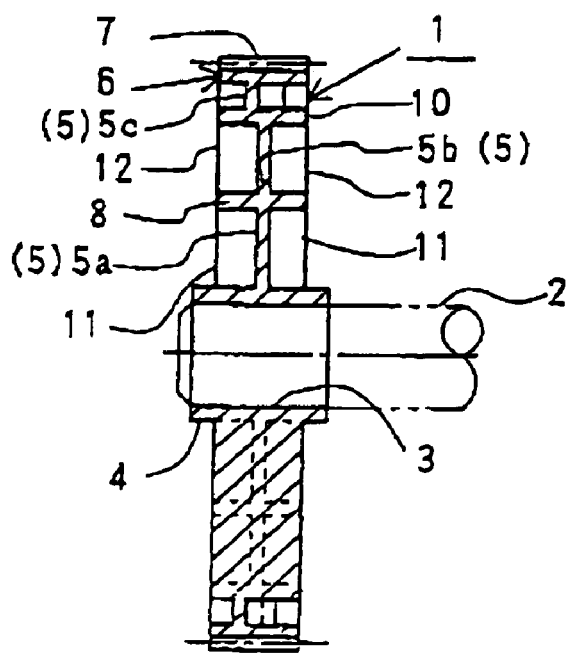
FIG. 2 is a sectional view of the gear made of the resin, taken along a line A—A in FIG. 1.
Figure 3:
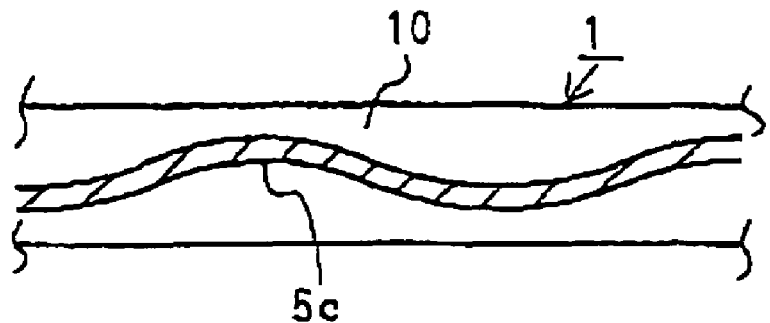
FIG. 3 is an enlarged sectional view taken along a line B—B in FIG. 1.

FIGS. 1 to 3 show a gear 1 made of a resin according to an embodiment of the present invention. As shown in FIGS. 1 to 3, the gear 1 is made by an injection molding using a resinous material such as a polyacetal, a polyamide, a polyphenylene sulfide, a polybutylene terephthalate and the like, and includes a shaft-supporting portion 4 having a shaft hole 3 defined therein and engaged with a shaft 2, webs 5 formed to extend radially outwards from an outer surface of the shaft-supporting portion 4, and a substantially annular toothed portion 6 connected to the shaft-supporting portion 4 by the webs 5. Teeth 7 having a corrugated shape suited for the purpose of use are formed around an outer periphery of the toothed portion 6.

A first substantially annular circumferential rib 8 is formed concentrically with the toothed portion 6 on each of opposite sides of the web 5 around the outer periphery of the shaft-supporting portion 4. A second substantially annular circumferential rib 10 is formed concentrically with the fist circumferential rib 8 on each of opposite sides of the web 5 between the first circumferential rib 8 and the toothed portion 6.

A plurality of diametrical ribs 11 are formed radiately on each of the opposite sides of the web 5a between the shaft-supporting portion 4 and the first circumferential rib 8 to connect an outer surface of the shaft-supporting portion 4 and an inner peripheral surface of the first circumferential rib 8 to each other. A plurality of diametrical ribs 12 are formed radiately on each of the opposite sides of the web 5b between the second circumferential rib 10 and the first circumferential rib 8 to connect an inner surface of the second circumferential rib 10 and an outer peripheral surface of the first circumferential rib 8 to each other.

Figure 17:
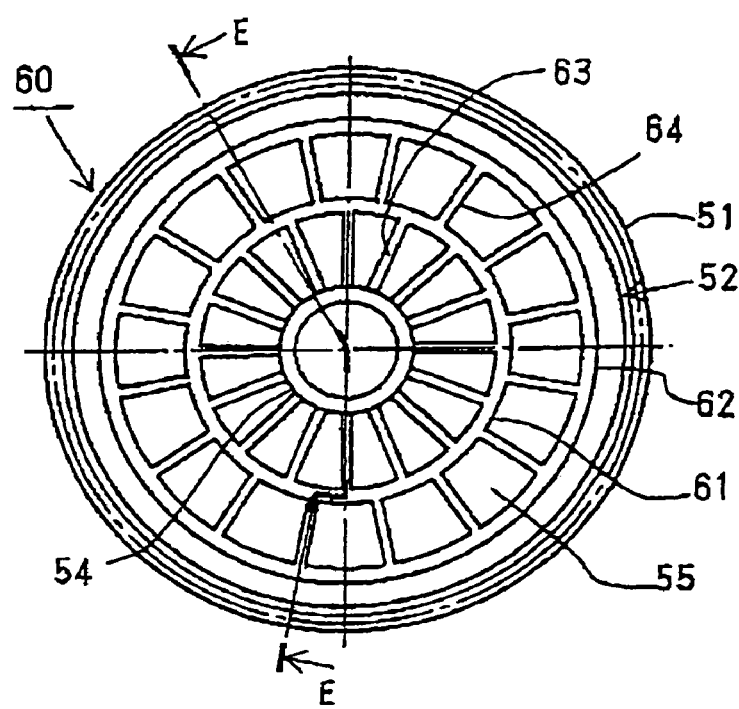
FIG. 17 is a front view of a gear made of a resin in a third prior art.
Figure 18:
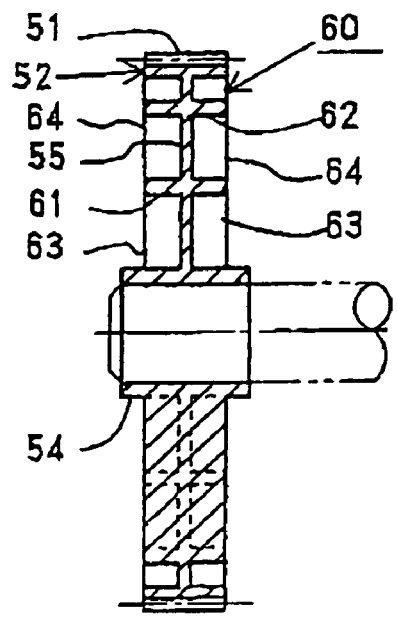
FIG. 18 is a sectional view of the gear taken along a line E—E in FIG. 17.

The outermost circumferential web 5c between the second circumferential rib 10 and the toothed portion 6 is formed into a circumferential sectional corrugated-shape contoured by a smooth curve at a thickness equal to those of the other webs 5a and 5b. If the present embodiment including the outermost web 5c formed into the corrugated shape is compared with the prior art (see FIGS. 17 and 18) including an outermost web 5c formed into a flat plate-shape, an area of connection between the outermost web 5c and the toothed portion 6 and an area of connection between the outermost web 5c and the second circumferential rib 10 in the present embodiment are larger than those in the prior art, and the rigidity of the outermost web 5c in the present embodiment is larger than that of an outermost circumferential web 55 in the prior art. In the present embodiment, even if the thickness of the outermost web 5c is equal to that of the outermost circumferential web 55 in the prior art, the rigidity of the outermost web 5c can be increased to a level larger than that in the prior art. Therefore, an increase in rigidity is possible without bringing-about of a reduction in accuracy of the toothed portion 6.

As described above, the gear 1 made of the resin according to the present embodiment is formed, so that the circumferential sectional shape of the outermost web 5c is the corrugated shape and hence, the rigidity of the outermost web 5c can be increased without increasing of the thickness of the outermost web 5c. Thus, the toothed portion 6 can be formed at a high accuracy, and the deformation due to an external force (e.g., the amount of displacement of the toothed portion 6 and the shaft-supporting portion 4 in a rotational direction) can be decreased, leading to an increased accuracy of the transmission of rotation.

In addition, the gear made of the resin according to the present embodiment is formed, so that the rigidity of the web 5 (5a and 5b) can be increased by the provision of the first circumferential rib 8, the second circumferential rib 10, the first diametrical ribs 11 and the second diametrical ribs 12, and the rigidity of the outermost web 5c can be increased by forming the outermost web 5c into the corrugated shape in circumferential section. Therefore, it is possible to reduce the torsional vibration due to a rotation-transferring force and the flexural vibration due to a thrust force (which is a force applied in a direction of a rotating axis and perpendicular to a rotating direction, thereby reducing a noise due to such vibrations.

The gear 1 made of the resin according to the present embodiment is applicable widely to a spur gear, a helical gear, a worm wheel bevel gear, an internal gear and the like.

The gear 1 made of the resin according to the present embodiment is formed so that the webs 5 (5a and 5b) are reinforced by the first and second circumferential ribs 8 and 10 and the first and second diametrical ribs 11 and 12. However, the present invention is not limited to such con-figuration, and the gear according to the present invention may be a gear formed so that at least a reinforcing circumferential rib (a first circumferential rib 8 or a second circumferential rib 10) is formed between a toothed portion 6 and a shaft-supporting portion 4, and the circumferential sectional shape of a web 5 between such circumferential rib and the toothed portion 6 is a corrugated shape.

Figure 4:
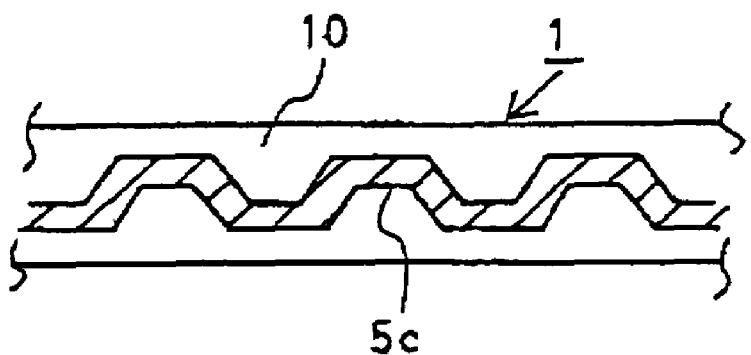
FIG. 4 is a view (similar to FIG. 3) showing a first application of the gear made of the resin according to the present invention.
Figure 5:
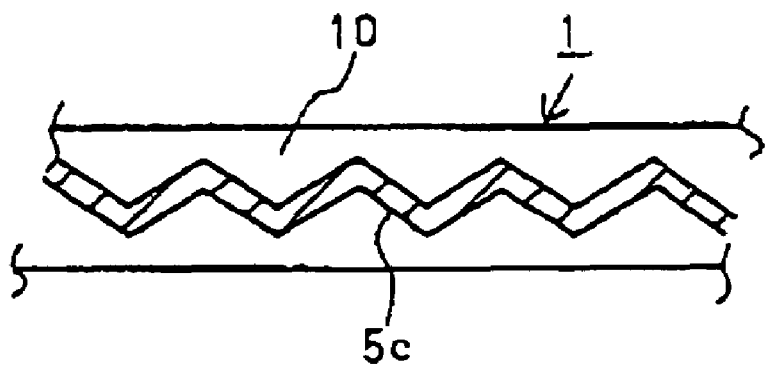
FIG. 5 is a view (similar to FIG. 3) showing a second application of the gear made of the resin according to the present invention.

In addition, the gear 1 made of the resin according to the present embodiment is formed so that the circumferential sectional shape of the outermost web 5c is the corrugated shape contoured by the smooth curve, as shown in FIG. 3, but the circumferential sectional shape of the outermost web 5c is not limited to such shape, and the outermost web 5c may be formed into a circumferential sectional shape as shown in FIG. 4 or 5.

More specifically, in a first application shown in FIG. 4, the circumferential sectional shape of the outermost web 5c is a substantially corrugated shape comprising trapezoids connected together at predetermined distances. In a second application shown in FIG. 5, the circumferential sectional shape of the outermost web 5c is a substantially corrugated shape comprising triangles continuously connected together.

The gear 1 made of the resin according to the present embodiment has been illustrated in the form in which the shaft 2 is fitted in the shaft hole 3 in the shaft-supporting portion 4, but the shaft 2 may be integrally formed on the shaft-supporting portion 4.

In addition, the gear 1 made of the resin according to the present embodiment may be used in the form in which the shaft 2 is relatively turnably fitted in the shaft hole 3 in the shaft-supporting portion 4, or may be used in the form in which the shaft 2 is relatively non-turnably fitted in the shaft hole 3 in the shaft-supporting portion 4 (i.e., so that the shaft and the gear made of the resin are turned in unison with each other).

Further, the gear 1 made of the resin according to the present embodiment has been illustrated in the form in which the first and second circumferential ribs 8 and 10 and the first and second diametrical ribs 11 and 12 are formed on the opposite sides of the webs 5, but the present invention is not limited, and the first and second circumferential ribs 8 and 10 and the first and second diametrical ribs 11 and 12 may be formed only one of the sides of the webs 5.

Additionally, in the gear 1 made of the resin according to the present embodiment, the circumferential sectional shape of the outermost web 5c is the substantially corrugated shape and hence, the rigidity of the outermost web 5c can be increased. Therefore, the thickness of the outermost web 5c may be reduced to an extent corresponding to such increase in rigidity.

II. Image Forming Device

Figure 6:
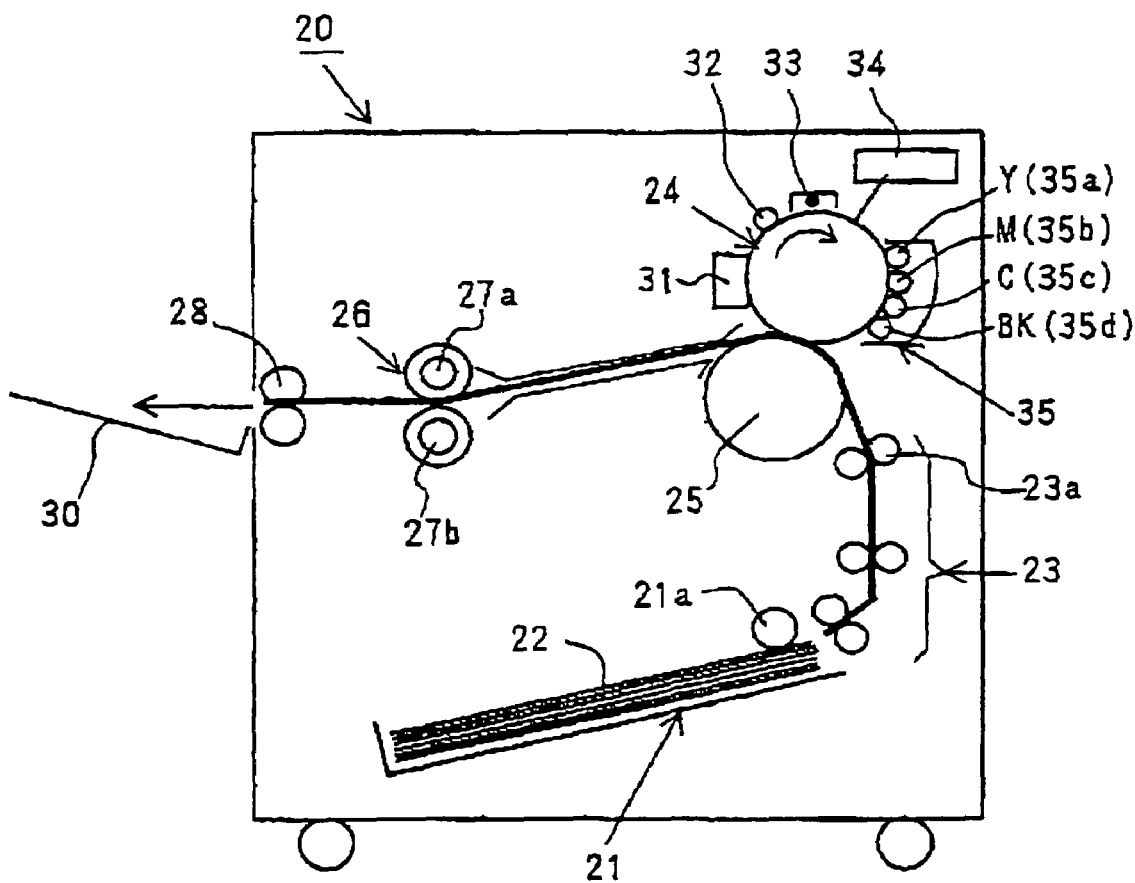
FIG. 6 is a schematic diagram showing the arrangement of an image-forming device using the gear made of the resin according to the present invention.

FIG. 6 shows a color duplicator (an image forming device) 20 utilizing the gear 1 made of the resin according to the above-described embodiment.

The image-forming device 20 shown in FIG. 6 is designed, so that a sheet material fed out of a paper-feeding section 21 is fed by a sheet-transporting section 23 to between a photoconductor 24 and a transfer roller 25, where a color image formed on the photoconductor 24 is transferred onto the sheet material 22; the sheet material 22 is then fed to between fixing rollers 27a and 27b of a fixing section 26, where the color image formed on the surface of the sheet material 22 is fixed; and the sheet material resulting from the completion of the fixing operation is discharged onto a paper-discharge tray 30 by a pair of paper-discharge rollers 28.

Figure 7:
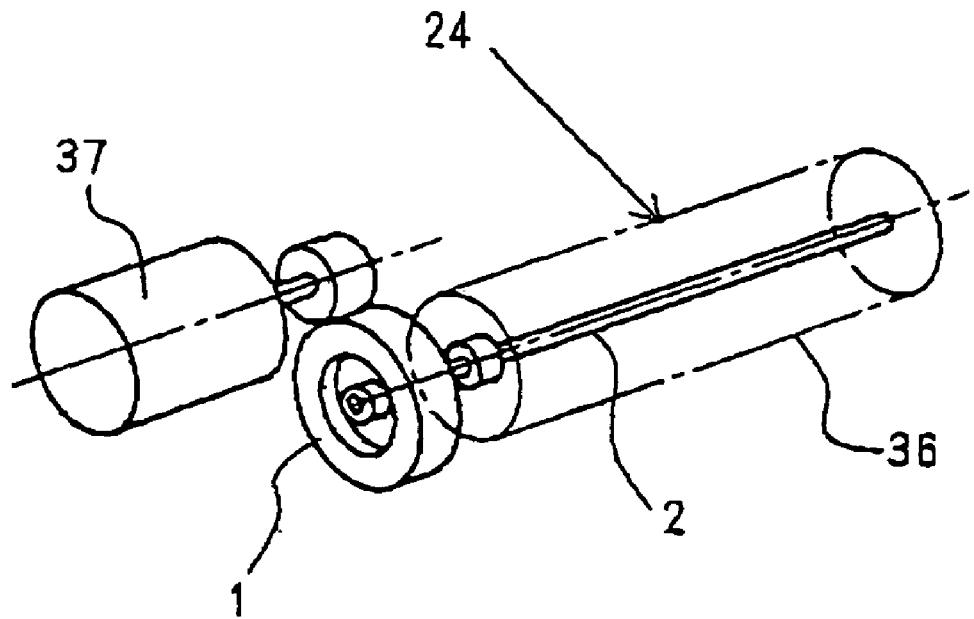
FIG. 7 is an illustration of a mechanism for driving a photoconductor drum.

The photoconductor 24 is adapted to be rotated in a clockwise direction (in a direction indicated by an arrow) as viewed in FIG. 6, and a cleaning unit 31, an antistatic lamp 32, an electrostatic charger 33, an exposing unit 34 and a color developing unit 35 are disposed around the photoconductor 24. In the photoconductor 24, for example, a photoconductor-driving shaft 2 fixed at the center of rotation of a photoconductor drum 36 is disposed in engagement with the shaft-supporting portion 4 of the gear 1 made of the resin according to the above-described embodiment, as shown in FIG. 7, so that it can be rotated in unison with the shaft-supporting portion 4 by a motor 37 as a drive means connected to the gear 1 of made of the resin, and color images comprising four colors: yellow (Y), magenta (M), cyan (C) and black (BK) are formed in a superimposed manner on the photoconductor 24.

In the image-forming device 20 having such arrangement, the rotation of the motor 37 is transmitted smoothly and with a good accuracy to the photoconductor 24 through the gear 1 made of the resin according to the above-described embodiment. Therefore, a variation in angular speed of rotation of the photoconductor 24 is inhibited, and the misalignment of the color images formed on the photoconductor 24 is inhibited, thereby enabling the printing of a clear color image. Moreover, the gear 1 made of the resin according to the above-described embodiment used for transmission of the rotation has the large rigidity such that the vibration can be reduced and hence, the generation of a noise due to the vibration can be inhibited to enable of the quiet formation of the image.

Figure 8:
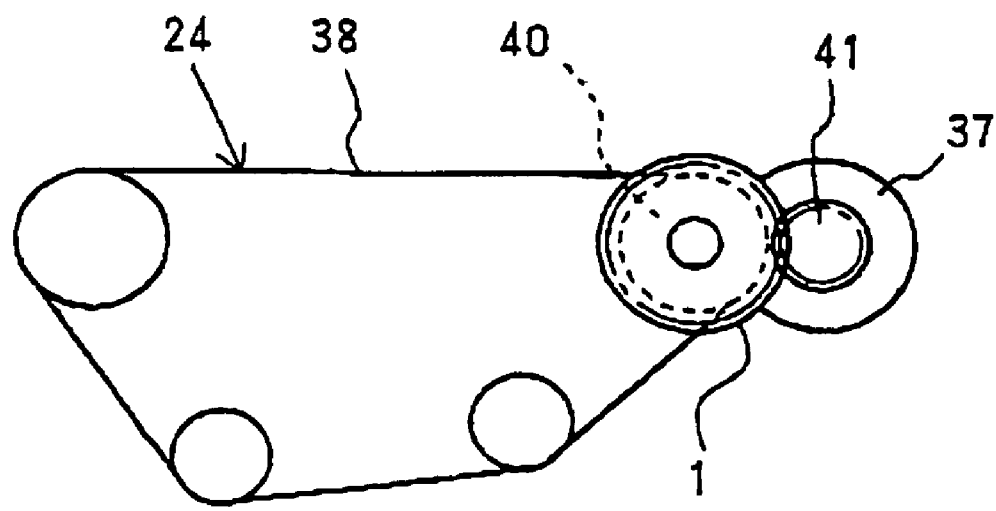
FIG. 8 is an illustration of a mechanism for driving a photoconductor belt.
Figure 9:
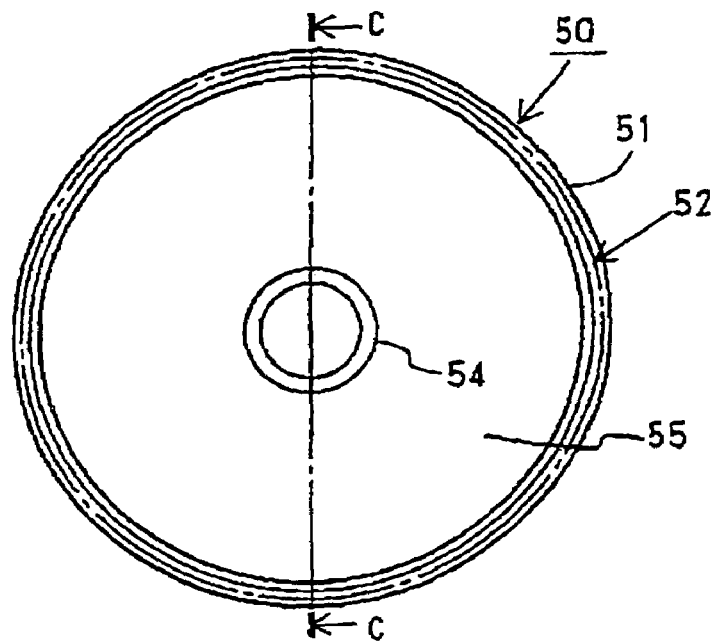
FIG. 9 is a front view of a gear made of a resin in a first prior art.
Figure 10:
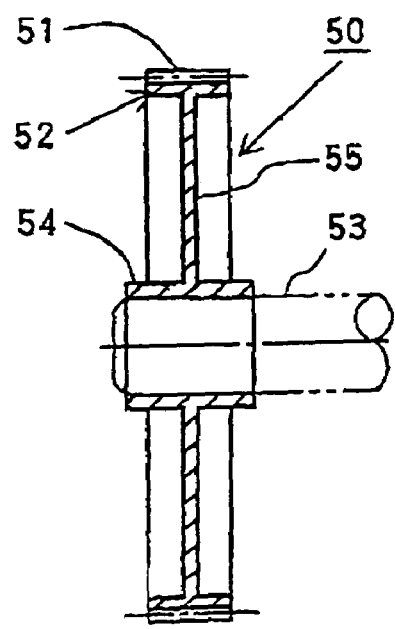
FIG. 10 is a sectional view of the gear taken along a line C—C in FIG. 9.
Figure 11:
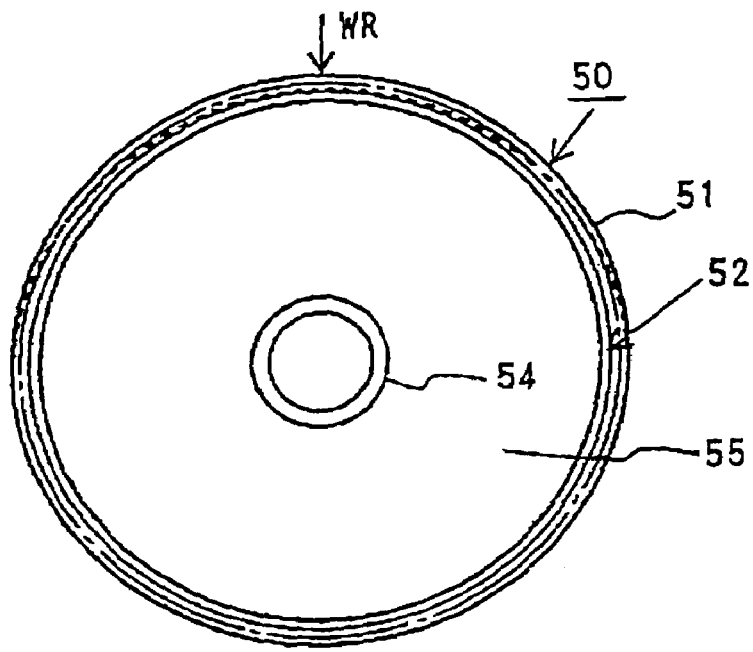
FIG. 11 is a front view showing the deformation of the gear in the first prior art due to a radial load.
Figure 12:
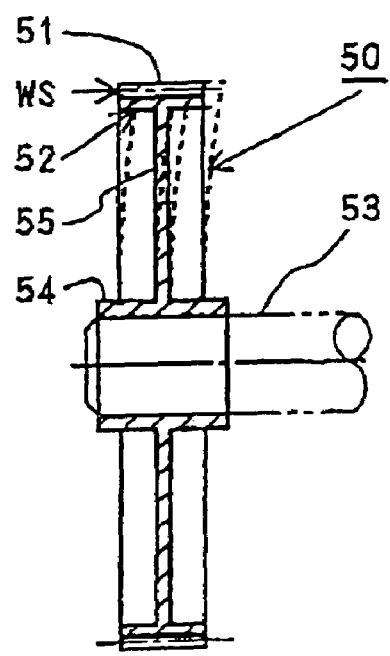
FIG. 12 is a sectional view showing the deformation of the gear in the first prior art due to a thrust load.
Figure 13:
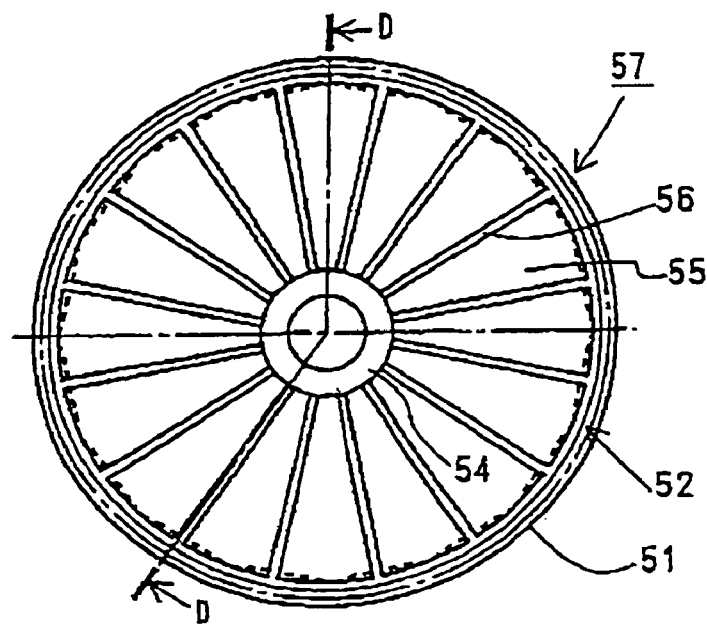
FIG. 13 is a front view of a gear made of a resin in a second prior art.
Figure 14:
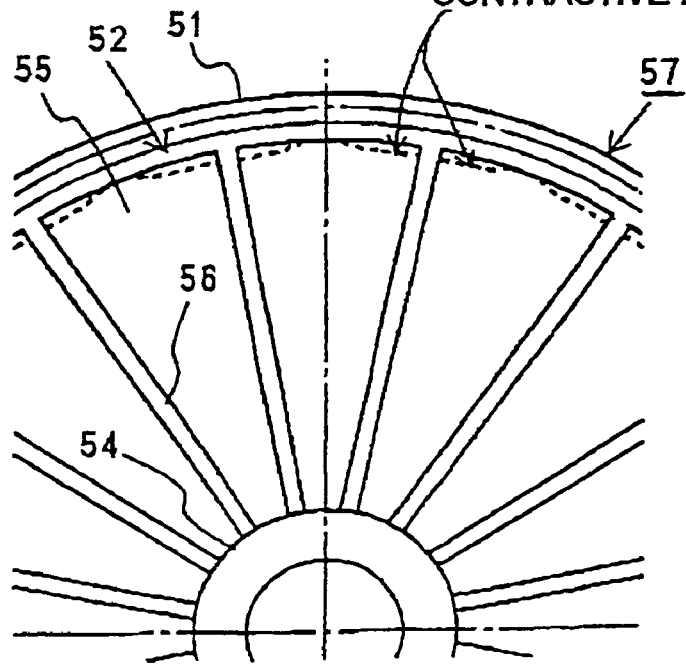
FIG. 14 is an enlarged view of a portion shown in FIG. 13.
Figure 15:
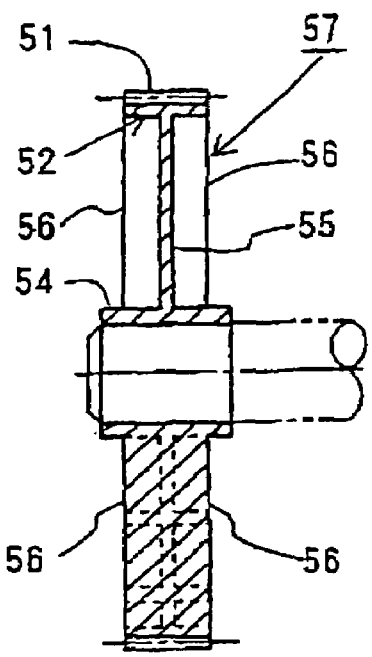
FIG. 15 is a sectional view of the gear taken along a line D—D in FIG. 13.
Figure 16:
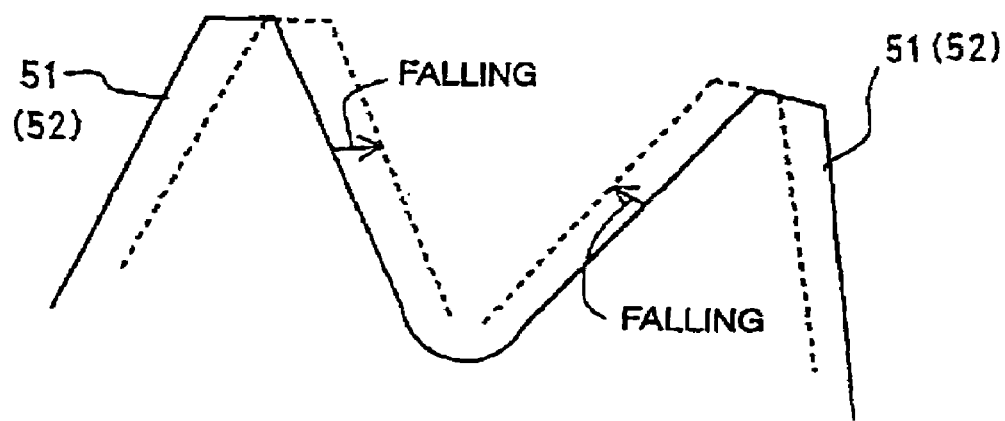
FIG. 16 is a diagram showing in an enlarged manner the deformation of teeth of the gear made in the second prior art.

In such embodiment, the photoconductor drum 36 has been illustrated as the photoconductor 24, but the photoconductor 24 is not limited to the photoconductor drum 36, and a photoconductor belt may be used as the photoconductor 24. More specifically, as shown in FIG. 8, the gear 1 made of the resin according to the above-described embodiment may be connected to a roller 40 for driving the photoconductor belt 38, so that it can be rotated in unison with the roller 40, and a gear (a gear made of a resin) of a motor 37 may be meshed with the gear 1 made of the resin, so that the rotation of the motor 37 may be transmitted to the driving roller 40 through the gear 41 and the gear 1 made of the resin to turn the photoconductor belt 38 smoothly and with a good accuracy. Even with such an arrangement, an effect similar to that in the above-described embodiment can be provided.

The above-described embodiment has been illustrated as the arrangement using the gear 1 made of the resin according to the present invention for driving the photoconductor 24, but the present invention is not limited to such arrangement, and the gear 1 made of the resin according to the present invention may be used properly as a driving gear, a rotation-transmitting idle gear or the like for a paper-feeding roller 21a in the paper-feeding section 21, a resist roller 23a in the sheet-transporting section 23, developing rollers 35a, 35b, 35c and 35d in the color developing unit 35, fixing rollers 27a and 27b and the like. Further, the present invention is not limited to the above embodiment, and in a case of an image-forming device (not shown) having an arrangement using an intermediate transfer member, the gear 1 made of the resin according to the present invention can be used for driving the intermediate transfer member.

The gear 1 made of the resin according to the present invention has been illustrated as being used in the image-forming device 20 such as a duplicator, a printer, a facsimile and the like, but the present invention is not limited to such image-forming device 20, and the gear 1 made of the resin according to the present invention is applicable widely to an ink-jet printer, an automobile part and many other precision machines to enable the rotation to be transmitted smoothly and with a high accuracy.

In addition, the present invention is not limited to the gear, and is applicable to a pulley made of a resin as a rotation-transmitting means made of a resin and having teeth meshed with a timing belt.

Although the embodiments of the present invention have been described in detail, it will be understood that the present invention is not limited to the above-described embodiments, and various modifications in design may be made without departing from the spirit and scope of the invention defined in claims.

What is claimed is:

1. A gear made of resin, comprising a substantially annular toothed portion formed at a radially outer location, a shaft-supporting portion formed at a radially inner location around a rotational center of said toothed portion, a web connecting said shaft-supporting portion and said toothed portion to each other, wherein
   at least two circumferential ribs are formed concentrically with the toothed portion and radially provided between said shaft-supporting portion and said toothed portion,
   a plurality of radially extending diametrical ribs are provided extending radially from an innermost side of a radially outermost of said at least two circumferential ribs toward said shaft supporting portion,
   said radially outermost of said at least two circumferential ribs being formed outside of an intermediate point in to radial direction which is between the rotational center of the gear and the outermost circumference of to gear, and
   the circumferential sectional shape of said web between said radially outermost of said at least two circumferential ribs and said toothed portion is a substantially corrugated shape.

2. An image-fomiing device comprising a gear made of a resin according to claim 1, and a drive means for driving a photoconductor through said gear made of the resin.

3. The gear according to claim 1, wherein said circumferential sectional shape of said web is a corrugated shape contoured by a smooth curve.

4. The gear according to claim 3, wherein a thickness of said web that has said circumferential sectional shape which is said corrugated shape contoured by said smooth curve is substantially equal to a thickness of said web between to shaft-supporting portion end said at least one circumferential rib.

5. The gear according to claim 1, wherein said circumferential sectional shape of said web is corrugated shape comprising triangles continuously connected together.

6. The gear according to claim 1, wherein a number of said plurality of radially extending diametrical ribs extending between said shaft-supporting portion and an innermost of said at least two circumferential ribs is substantially equal to a number of said plurality of radially extending diametrical ribs extending between said at least two circumferential ribs.

7. A rotation-transmitting means made of a resin, comprising a substantially annular toothed portion formed at a radially outer location, a shaft-supporting portion formed at a radially inner location around a rotational center of said toothed portion, a web connecting said shaft-supporting portion and said toothed portion to each other, wherein
   said web has at least two circumferential ribs formed thereon concentrically with said toothed portion, a plurality of radially extending diametrical ribs are provided between said shaft-supporting portion and an innermost side of a radially outermost of said at least two of said circumferential ribs, said radially outermost of said at least two circumferential ribs being formed outside of an intermediate point in the radial direction which is between the rotational center of the gear and the outermost circumference of the gear, and the circumferential sectional shape of said web between an outermost side of said radially outermost of said at least two circumferential ribs and said toothed portion is a substantially corrugated shape.

8. The gear according to claim 7, wherein a number of said plurality of radially extending diametrical ribs extending between said shaft-supporting portion and an innermost of said at least two circumferential ribs is substantially equal to a number of said plurality of radially extending diametrical ribs extending between said at least two circumferential ribs.

* * * * *